United States Patent [19]

Spenceley et al.

[11] Patent Number: 4,701,216
[45] Date of Patent: Oct. 20, 1987

[54] MELTING OF METALS

[75] Inventors: Gene D. Spenceley, Tamebridge; Brian C. Welbourn, Whitby, both of England

[73] Assignee: British Steel Corporation, London, England

[21] Appl. No.: 876,818

[22] Filed: Jun. 20, 1986

[30] Foreign Application Priority Data

Jun. 26, 1985 [GB] United Kingdom ............... 8516143

[51] Int. Cl.$^4$ ........................... C21C 5/32; C21C 5/34
[52] U.S. Cl. ..................................... 75/59.1; 75/51.2; 75/51.5
[58] Field of Search ..................... 75/51.2, 51.5, 59.1

[56] References Cited

U.S. PATENT DOCUMENTS

| | | | |
|---|---|---|---|
| 4,089,677 | 5/1978 | Spenceley et al. | 75/51 |
| 4,304,598 | 12/1981 | von Bogdandy | 75/51.5 |
| 4,329,171 | 5/1982 | Robert | 75/51.5 |
| 4,411,697 | 10/1983 | Spenceley | 75/51.2 |
| 4,430,117 | 2/1984 | Spenceley | 75/51.5 |
| 4,537,629 | 8/1985 | Navarro | 75/51.2 |

FOREIGN PATENT DOCUMENTS 1057041 1/1984 United Kingdom ............... 75/41

Primary Examiner—Peter D. Rosenberg
Attorney, Agent, or Firm—Kinney & Lange

[57] ABSTRACT

The invention provides a method of melting and superheating ferrous material comprising the steps of charging a vessel with ferrous material and injecting into the vessel coal and oxygen in such ratios as to combust the coal to provide adequate heat for the melting of the ferrous material and to provide residual carbon in the melt to superheat the melt upon oxidation of the carbon.

12 Claims, 2 Drawing Figures

MELTING OF METALS

BACKGROUND OF THE INVENTION

1. Field of the Invention

This invention relates to the melting of metals and more particularly to the melting and superheating of solid ferrous metal.

2. Description of the Prior Art

The melting of scrap or other ferrous solid material within arc furnaces is, of course, a well known concept. However, the electrical energy required for satisfactory melting of such solid material is considerable and taken together with associated electrode costs contributes very significantly to total costs. The conversion of coal to electricity is itself a low efficiency process and thus the melting of scrap in an arc furnaoe represents an overall inefficient use of the basic fossil fuel.

It is an object of the present invention to provide for the melting of metal which significantly reduces the above mentioned problem.

SUMMARY OF THE INVENTION

In accordance with of the present invention there is provided a method of melting and superheating ferrous material comprising the steps of charging a vessel with ferrous material and injecting into the vessel coal and oxygen in such ratios as to combust the coal to provide adequate heat for the melting of the ferrous material and to provide residual carbon in the melt to superheat the melt upon oxidation of the carbon.

By the expression "superheating" as used herein is meant the raising of the temperature of the melt above its melting point such that at the end of the heat the melt is at a temperature sufficient to allow satisfactory transport and/or casting of the molten metal.

By the expression "ferrous material" as used herein is meant ferrous scrap and/or other ferrous containing solid material.

The coal and oxygen are introduced in such a ratio as to control the carbon content both during the melting and the superheating stages.

The vessel may contain in its base wall, for example, tuyeres or porous bricks for the injection of stirring gas into the melt, to aid melting by assisting heat transfer.

A ferrous melt produced in accordance with the invention may be subsequently transferred to a further processing vessel for secondary steel refining.

The coal may be introduced via a carrier gas by means of a separate lance or tuyere from that used for the oxygen rich gas, or may be delivered to a single lance or lances for the injection of oxygen and coal in combination for combustion in the vessel, or may be introduced within coaxial injection lances, for example, with the coal in the outer annulus whilst the oxygen is supplied through the inner bore. The lance or lances may be watercooled.

The vessel may be provided with a plurality of injecting tuyeres or lances.

The coal may be in powder or granular form and may be in a wide range of sizes from, for example, 3 mm mean diameter down to less than 50 microns.

The coal used may be of any suitable kind for comminution to the required size and combustion capability, such as medium to high volatile general purposes coal.

A variety of dispensing equipment can be utilized for feeding the coal to its delivery pipe.

Thus, dispensing can be by means of a conventional screw feed system or by fluidization as a means of supplying coal to the delivery pipe.

In an alternative arrangement, proprietory equipment can be used which successively comminutes and dispenses to its delivery pipe, coal supplied thereto.

The rates of injection of coal and oxygen may be varied to meet local circumstances and requirements, and in particular, the operating requirements of the vessel concerned. The proportion of oxygen to coal may be such as to be at sub-stoichiometric levels during the melting stage, although the proportions may vary depending upon whether carbon is to be added or substracted to the melt, as hereinafter explained in more detail.

The proportion of oxygen to carbon during the superheating stage may be above stoichiometric levels with the porportions being determined by the amount of superheat required and the carbon content of the melt as the process progresses.

The invention includes within its scope apparatus for carrying out the method as hereinbefore defined.

BRIEF DESCRIPTION OF THE DRAWINGS

In order that the invention may be more readily understood, one embodiment thereof will now be described by way of example with reference to the accompanying drawings in which.

DETAILED DESCRIPTION OF THE PREFERRED EMBODIMENTS

Figure 1:
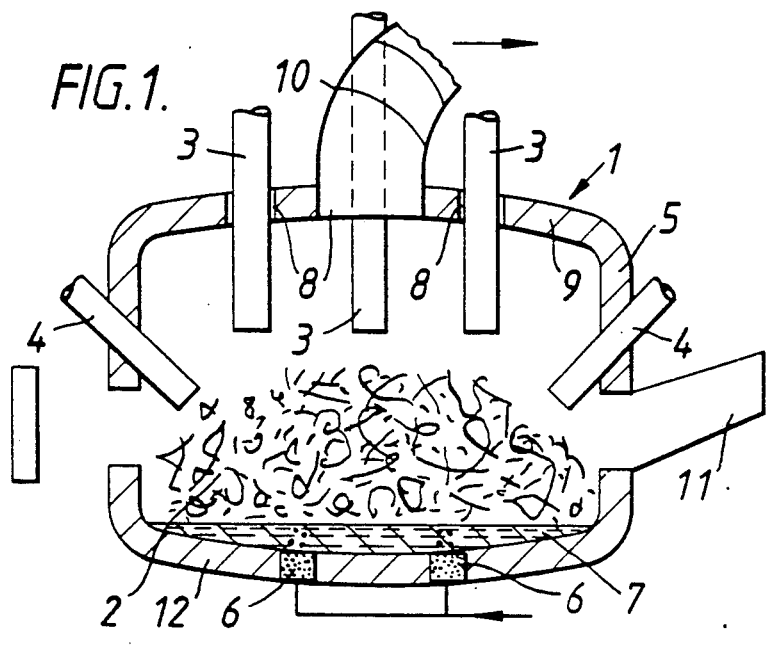
FIG. 1 is a diagrammatic sectional elevation of apparatus for carrying out the method of present invention.
Figure 2:
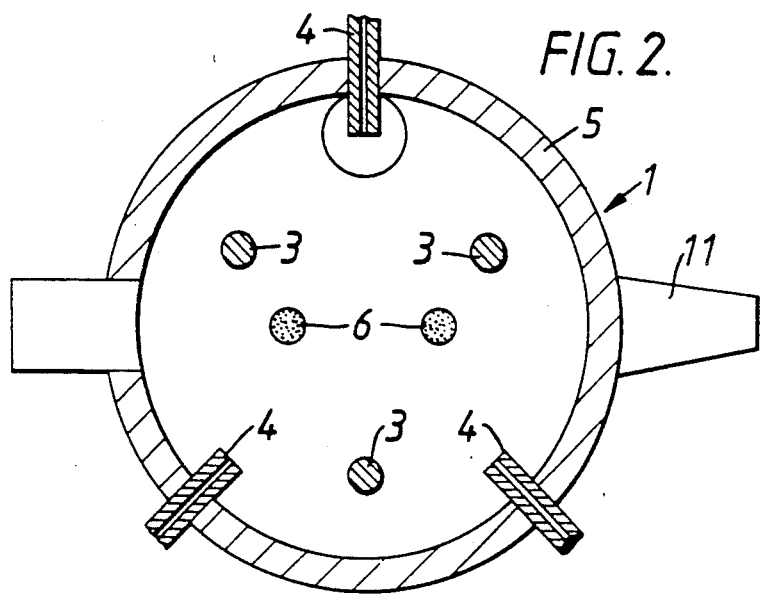
FIG. 2 is a diagrammatic sectional plan view of the apparatus of FIG. 1.

Referring now to the drawings, it will be seen that the apparatus is generally in the configuration of a conventional arc furnace. The furnace 1 is provided with a charge of scrap 2 together perhaps with some pig iron, the scrap being of normal steel characteristic. A plurality of coaxial carbon and oxygen injection lances are utilized for the introduction of the burning carbon and oxygen combination. It is to be observed that in the embodiment illustrated three such water-cooled lances 3 project through the openings 8 normally utilized by the arc electrodes, whilst three further lances 4 project diagonally through the side walls 5 of the furnace. The furnace may be provided with refractory lining for the hearth and banks of the furnace, but the side walls and roof may be formed from water cooled panels.

A waste gas and fume exit 10 is provided in the furnace roof 9.

The vessel is provided with porous elements 6 in the base 12 for the introduction of a stirring gas into the melt 7.

The three burner lances 3 projecting through the roof 9 will be on a similar pitch circle to that used for electrodes for an arc furnace as previously mentioned and are capable of burning coal of a wide range of stoichiometry. The burner lances 4 projecting through the side walls 5 of the furnace have a dual role, firstly to act as burners for heating the charge and secondly, to allow injection of coal or other carbonaceous material into the melt to control carbon content such as to raise the liquid steel temperature after melting to the correct tapping value.

The lower stirring elements 6 are constituted by refractory blocks with either slot or small pipes for the gas passages. The gas used for stirring is usually inert although reactive gases such as carbon dioxide of air can, at times, be used.

The scrap charge 2 to the furnace will be made in the conventional manner by basket additions. The number of baskets utilized would be in practical terms kept to a minimum dependent upon the size of furnace. The charge, in practice, could contain a proportion of pig iron with the remainder steel scrap. Recarburiser agent could also be charged and flux additions such as lime for slag making may be added via basket additions.

After charging, the furnace is operated with the intention of melting the scrap and raising the liquid steel to the appropriate tapping temperature (approximately 1650° C.). Normally the steel so obtained is transferred for secondary refining via a tapping spout 11, although where only a simple specification steel is required, it is possible that this could be produced in the melting vessel. In normal operation secondary ladle steel making would be utilized. The system is capable of some sulphur removal during melting and superheating within the melting vessel by appropriate slag control.

In practical terms, melting commences with the roof burners 3 lowered until their tips are approximately 2 meters above the hearth. The charge is then melted from this point with the aid of the side wall burners 4. As the pool of liquid metal 7 in the base 12 of the furnaces increases and the scrap falls into this, the roof burners 3 will be retracted to control burner to bath distance. During these operations the coal will be burned with the oxygen at stoichiometric conditions or slightly therebelow. The stirring gases will commence through elements 6 at a low rate of injection which increases as the size of the liquid steel pool 7 increases to aid heat transfer therethrough. Should a second basket charge of scrap be required the process of melting is repeated.

At completion of the melting process (melt-out) the liquid steel will commonly be at 1550° C. and contain approximately 1.4% carbon. At this stage the coal feed to the side wall burners 4 may be turned off and the roof burner coal rate is reduced whilst the oxygen flow rate is maintained thus moving the stoichiometric value to greater than 100%. A figure of around 2 to 3 times stoichiometric conditions could be the normal condition applicable. The effect of this process is to allow oxidation of the carbon from the liquid bath. The heat released results in the liquid steel being superheated to its tapping temperature of around 1650° C. Should carbon level in the steel at the completion of the melting process be below the desired level to achieve such subsequent tapping temperature, coal can be injected into the bath via the side wall lances 4 or by the top lance or by a separate subsidiary lance. The quantity of coal required will be dependent upon the melting condition carbon level and temperature. A subsidiary lance may be used to introduce oxygen into the system during the melting and/or superheating stages.

By use of this technique of carbon control the heat is more efficiently transferred to the bath at steel making temperatures by bath carbon oxidation. Without the carbon control provided by means of the invention thermal recovery to the melt and during superheating would be very inefficient, at best 20%, thus resulting in increased process times and energy being wasted. Bath stirring will also be used to assist in optimizing the carbon/oxygen reaction and minimizing the state of bath oxidation and therefore ensuring a good yield.

On completion of the superheating phase of the operation, the liquid steel is normally tapped from the furnace for compositional treatment in a secondary steel making vessel.

We claim:

1. A method of melting and superheating ferrous material comprising the steps of charging a vessel with ferrous material and injecting into the vessel coal and oxygen in such ratios as to combust the coal to provide adequate heat for the melting of the ferrous material and to provide residual carbon in the melt to superheat the melt upon oxidation of the carbon.

2. A method as claimed in claim 1 wherein the coal and oxygen are introduced in such ratio as to control the carbon content of the melt both during the melting and the superheating stages.

3. A method as claimed in claim 1 wherein the proportion of oxygen to coal injected is such as to be at sub-stoichiometric levels during the melting stage.

4. A method as claimed in claim 1 wherein the proportion of oxygen to coal injected is such as to be at above stoichiometric levels during the superheating stage.

5. A method as claimed in claim 1 wherein a stirring gas is injected into the melt during at least one of the stages.

6. A method as claimed in claim 1 wherein the coal is granular and within a size range of 3 mm to less than 50 microns mean diameter.

7. A method as claimed in claim 1 wherein the coal is a medium to high volatile general purpose coal.

8. A method as claimed in claim 1 wherein the coal is introduced into the vessel by means separate from that used for the oxygen rich gas during at least one of the stages.

9. A method as claimed in claim 1 wherein the coal and oxygen rich gas are injected into the vessel in combination in at least one lance.

10. A method as claimed in claim 1 wherein the coal and oxygen rich gas are injected into the vessel by means of at least one coaxial lance, with the coal in the outer annulus and the oxygen rich gas in the inner bore.

11. A method as claimed in claim 1 wherein the coal is supplied for injection from a delivery pipe, and is passed to the delivery pipe from apparatus arranged to comminute and dispense coal provided thereto.

12. A method of melting and superheating a ferrous material comprising the steps of charging a vessel with ferrous material and injecting into the vessel coal and oxygen in close association and in such ratios as to combust the coal and to provide adequate heat for the melting of ferrous material and to provide residual carbon in the melt to superheat the melt upon oxidation of the carbon, the ratios being such as to provide a proportion of oxygen to coal injected such as to be at or below stoichiometric levels during the melting stage and such as to be at above stoichiometric levels during the superheating stage.

* * * * *